United States Patent [19]

Birkeholm

[11] 4,231,442
[45] Nov. 4, 1980

[54] APPARATUS FOR BRAKING A TRAIN OF VEHICLES

[76] Inventor: Mogens Birkeholm, Kagsaavej 59, 2730 Herlev, Denmark

[21] Appl. No.: 934,983

[22] Filed: Aug. 18, 1978

Related U.S. Application Data

[63] Continuation-in-part of Ser. No. 786,565, Apr. 11, 1977, Pat. No. 4,113,041, which is a continuation of Ser. No. 584,029, Jun. 5, 1975, abandoned.

[51] Int. Cl.³ .............................................. B60T 7/20
[52] U.S. Cl. .............................. 180/14 R; 188/112 R; 280/432; 280/446 R; 303/47
[58] Field of Search ................ 180/14 C, 14 D, 14 R, 180/14.5, 82 D; 188/112 R, 3 R; 303/47, 7, 24 R, 24 A; 280/432, 446 R, 446 A

[56] References Cited

U.S. PATENT DOCUMENTS

| | | | |
|---|---|---|---|
| 2,377,318 | 6/1945 | Born et al. | 188/3 R |
| 2,869,807 | 1/1959 | Hyland | 244/111 |
| 2,957,658 | 10/1960 | Nichols | 244/111 |
| 2,957,659 | 10/1960 | Yarber | 244/111 |
| 2,985,488 | 5/1961 | Stelzer | 303/47 |
| 3,017,145 | 1/1962 | Yarber | 244/111 |
| 3,819,238 | 6/1974 | Cermak | 303/47 |
| 3,953,082 | 4/1976 | Smith | 303/24 R |
| 3,955,652 | 5/1976 | Nilsson et al. | 188/112 |

FOREIGN PATENT DOCUMENTS

1506001 7/1969 Fed. Rep. of Germany .

Primary Examiner—John J. Love
Assistant Examiner—Donn McGiehan
Attorney, Agent, or Firm—Kenyon & Kenyon

[57] ABSTRACT

An apparatus for braking a train of vehicles whereby a differentiated braking of the wheels is carried out by servo-mechanical means in such a manner that the rear wheels are the only ones activated directly by the driver during braking. The wheels of the immediately preceding vehicle are then activated in response to drawbar tension forces, and this applies all the way to the first of the train of vehicles. Thereby it is ensured that during braking a tension force is exerted throughout the whole of the train of vehicles, and in this way skidding and jackknifing or fishtailing of the train essentially can be prevented or avoided.

7 Claims, 6 Drawing Figures

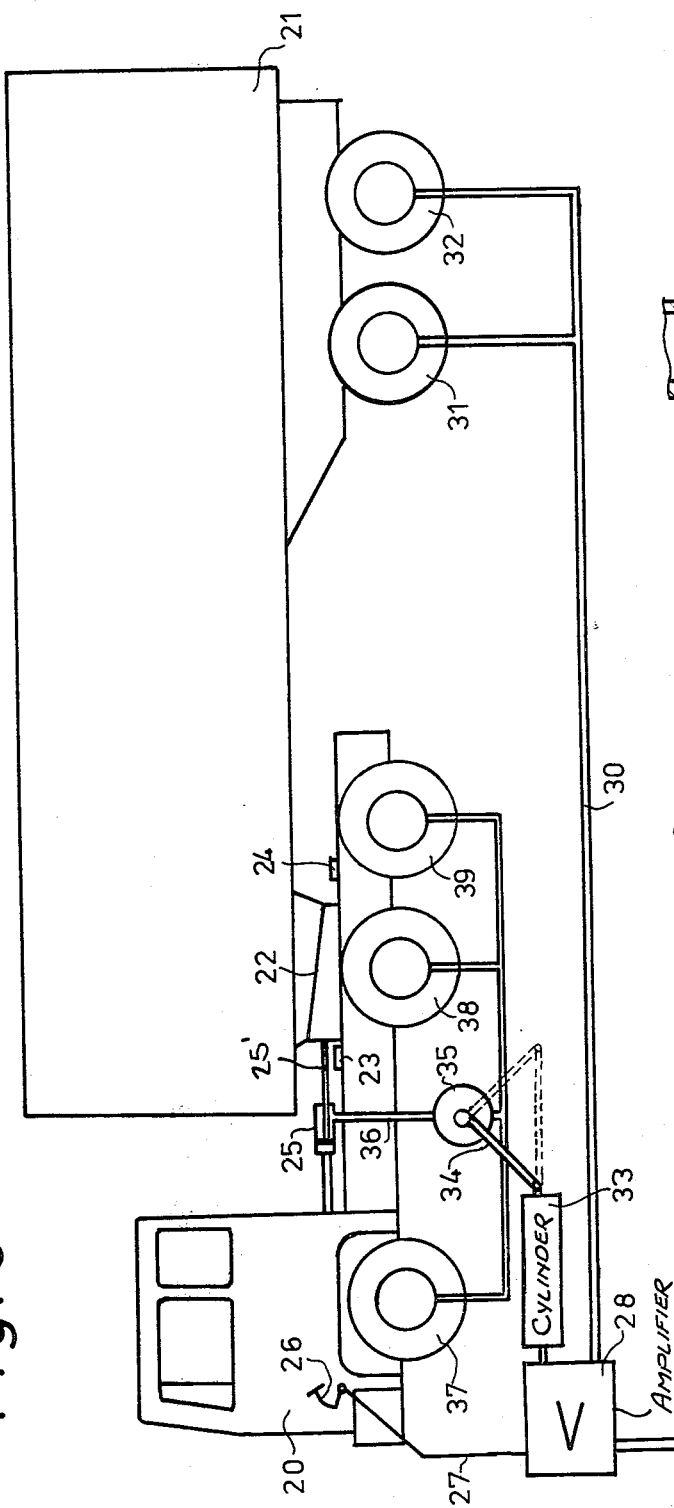

APPARATUS FOR BRAKING A TRAIN OF VEHICLES

CROSS-REFERENCE TO RELATED APPLICATION

This application is a continuation-in-part of my copending application Ser. No. 786,565 filed on Apr. 11, 1977 and now issued as U.S. Pat. No. 4,113,041 on Sept. 12, 1978, which is itself a continuation of Ser. No. 584,029 filed on June 5, 1975 and subsequently abandoned.

BACKGROUND OF THE INVENTION

This invention relates to an apparatus for braking of a train of vehicles consisting of a tractor vehicle and at least one trailer vehicle.

Braking a train of road vehicles, e.g., a tractor and semitrailer or a truck with one or more trailers, presents great technical problems, especially when the road is slippery. Due to unequal braking forces at the individual wheels or to different friction conditions between the wheels and the road, there is a risk of the vehicles skidding and the rear vehicle fishtailing or, more seriously, the whole train jackknifing. Once the vehicle train has started to skid, it is almost impossible for a driver to regain control.

Up to now, efforts have been concentrated on preventing the onset of skidding by means of ingenious brake designs. In some systems the braking pressure delivered to each wheel brake has been individually controlled, in the same manner as with the well known anti-skid systems for airplanes. (See, for example, the aircraft anti-skid systems in U.S. Pat. No. 2,957,658; No. 2,957,659; No. 2,869,807; and No. 3,017,145). Such systems continuously sense the rate of rotation and/or the rate of change of rotation of the individual wheels. The measured rates or changes in rates of rotation are compared with each other and/or with the actual speed or deceleration of the vehicle. The pressure applied to each individual wheel brake then is released or otherwise adjusted if the speed of the wheel falls below the speed of the other wheels or inertial sensors detect an incipient skid; so that the rate of rotation of the wheel is just the permitted limit value at which optimal braking is obtained without the wheels being locked or a skid developing. However, these systems have shown an unfortunate tendency to oscillate, due to, among other things, interaction with the natural frequency of the wheel suspension and the large number of wheels in a train of vehicles as compared with an airplane. Furthermore, providing a brake control system for each wheel of a tractor-trailer combination is very expensive.

SUMMARY OF THE INVENTION

The purpose of the invention is to provide an apparatus whereby the braking of a train of vehicles can be effected simply and safely without risk of skidding.

The invention comprises initially activating only the brakes of the rear vehicle in a train of vehicles, measuring the pulling force thus produced between the rear vehicle and the second rear vehicle, and then activating the brakes of the second rear vehicle by means of automatic devices in proportion to the pulling force measured, such that this pulling force remains positive. Automatic braking of each next preceding vehicle ahead thereof can be effected using the same principle. In this way no compressive force will develop in the connections between the individual vehicles in a train, provided that the automatic devices function early enough.

The invention, as stated, relates to an apparatus, this apparatus comprising devices known per se, such as pneumatic or hydraulic devices for braking the rear wheels of the train of vehicles and automatic devices for measuring the pulling or tension forces between vehicles or between the wheels of individual vehicles, or forces that are essentially proportional therewith, in combination with electrical or mechanical switch means (e.g., valve devices) for controlling the braking of the other vehicles as above.

In addition to the safety inherent in providing braking from the rear of a train of vehicles forward, so that no compression forces develop that can aggravate the tendency to jackknife, the method and apparatus of the present invention have the further advantage that they are fully compatible and can be used with conventional anti-skid devices on some of the wheels, preferably the rear wheels, or all of the wheels of a vehicle train, if desired.

One embodiment of the apparatus comprises electrical devices for measuring the tractive forces, for example strain gauges, and electro-mechanical servo-circuits for activating the brakes in accordance with the force signals. This permits a wide choice as to location of the measuring devices. They can be fitted at any place of the structure where a change in the transmitted forces will occur upon braking of the following vehicle in a train, or upon braking of the rear wheels of an individual vehicle in the train.

Another embodiment of the apparatus comprises hydraulic piston and cylinder devices for measuring the tractive forces in each case, which are incorporated in the members transmitting the tractive forces in the same way as a push-activated brake, such that the pressure side of each piston, responsive to tractive forces, is directly connected with a hydraulic brake system on the vehicle just in front of it, and further comprising valve means inserted in hydraulic lines leading from the piston and cylinder device to the wheels, the valve means being designed to permit free passage both ways when the driver activates the brake pedal, whereas they permit only return flow to the piston and cylinder device when the brake pedal is not activated. By this construction any risk of compressive forces occurring between two vehicles in a train is eliminated because each force sensing device also serves as the actuating device for the brakes of the preceding vehicle.

A further development of this embodiment of the invention is characterized in that each valve means is designed with a movable valve body which is open in one position and which in another position has a non-return valve inserted, for example a ball check valve, the valve means being designed so that it can be controlled by means of a brake pedal in the tractor vehicle such that the valve body will move to the open position when the brake pedal is activated and move to the other position when the brake pedal is released. This constitutes a very simple construction.

Another development of this embodiment of the invention is characterized in that the rear trailer vehicle can be braked by means of a pneumatic system from the tractor vehicle, and in that the tractor vehicle is provided with a pneumatic brake system which serves as a reserve system when a trailer is connected and as a main system when this is not the case. As most tractors or vans today are provided with two brake systems for safety reasons, this construction is very simple and expedient, as the most essential part of the braking is done mechanically or hydraulically.

BRIEF DESCRIPTION OF THE DRAWINGS

The invention is described in more detail in the following section, with reference to the accompanying drawings in which FIG. 3 shows a side view of a tractor and a semi-trailer provided with one embodiment of the braking apparatus of the invention, as shown in schematic form below the drawing of the tractor and the semitrailer, FIG. 4 shows a schematic end view of a valve designed for this apparatus, FIG. 5 shows a schematic side view of the valve of FIG. 4.

DESCRIPTION OF THE PREFERRED EMBODIMENTS

Figure 1:
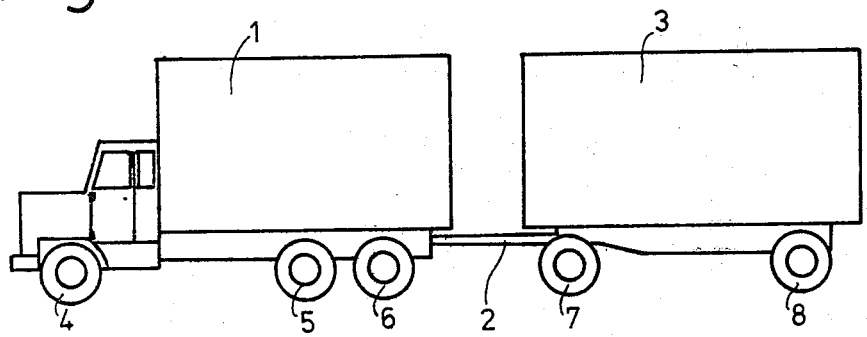
FIG. 1 shows a side view of a van with a trailer.
Figure 2:
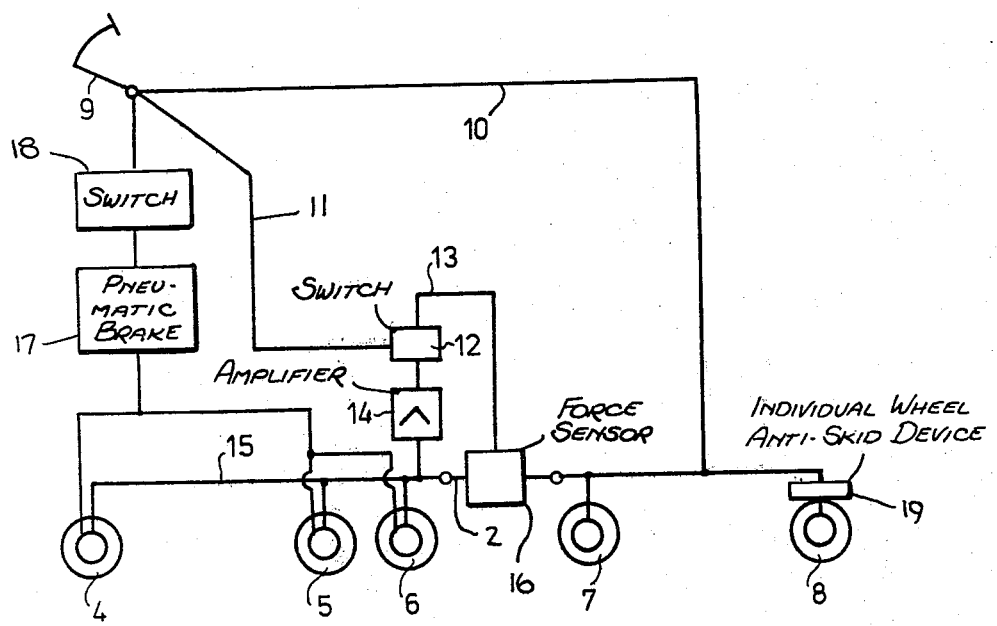
FIG. 2 shows a diagram of the brake system of the van and the trailer according to this invention.

In FIG. 1, a van 1 is connected by a drawbar 2 to a trailer 3 in a conventional way. FIG. 2 is related to FIG. 1, as the wheels 4, 5, 6, 7, and 8 of the van and the trailer are indicated by the same reference numbers in the two figures. FIG. 2 shows a brake pedal 9 of the van 1. This pedal, when it is pressed, will activate the brakes on the wheels 7 and 8 of the trailer 3 through a line 10, possibly through a brake booster, not shown on the drawing. At the same time, activation of brake pedal 9 will send a signal through a line 11 to a switch means 12, which enables a signal from a force sensor 16 in drawbar 2 to pass through a line 13 to an amplifier or booster 14. The amplified signal then passes through a line 15 to activate brakes 4, 5, and 6 of the van. The automatic control is designed such that the braking of van wheels 4, 5, and 6 will adjust itself at a reference value corresponding to a certain preset positive tension force. This is achieved by means of servo-mechanism devices known per se. The transmitted force in the drawbar 2 can be measured electrically (e.g., by strain gauges), mechanically (for instance by means of springs), or hydraulically.

The braking can be effected by means of ordinary pneumatic, electric or hydraulic amplifiers or boosters. In particular, the braking means for the trailer wheels can be a pneumatic braking system. In such case, the tractor vehicle may be provided also with a pneumatic braking system 17 coupled to the brake pedal 9 through a switch means 18 to cause the pneumatic system 17 to be a reserve braking system for the tractor vehicle when a trailer is connected and to be the main braking system for the tractor vehicle when no trailer is connected.

In addition, the rear wheels 8 of tractor 3 may be equipped with individual anti-skid systems 19 of conventional design for each wheel. If desired, all wheels of trailer 3 can be equipped with such anti-skid systems, or even all wheels of the entire train of vehicles, although this latter precaution should not be necessary because of the inherent safety provided by the braking system of this invention. The conventional anti-skid devices of the type described above on the rear, or all, wheels of the trailer, however, prevent skidding or brake lock of these wheels, which are braked by actuation of the primary braking system of the invention.

Thus, by assuring that during braking there is a positive tension force in drawbar 2, the trailer cannot skid. On occasions when no braking takes place, a compressive force in the drawbar may develop naturally through simple pushing. If desired, the present invention may be supplemented by a device signalling to the driver if this should happen.

FIG. 3 shows a train of vehicles consisting of a tractor vehicle 20 and a semitrailer 21. A coupling 22 for semitrailer 21 is horizontally movable with respect to tractor vehicle 20 in a longitudinal direction between stop blocks 23 and 24 or similar devices. Between coupling 22 and the vehicle 20 a piston and cylinder 25 is inserted which transmits the pulling forces between the tractor vehicle 20 and semitrailer 21, the cylinder being connected with one vehicle and the piston with the other through a piston rod 25'. During normal driving with the tractor vehicle 20 pulling the semitrailer 21, the coupling 22 will be in its front position, resting against the stop block 23, and hydraulic oil will be enclosed on the pressure side of the piston. The oil pressure is proportional to the pulling force between the tractor and the trailer.

When the driver wants to brake, he presses the brake pedal 26, which acts through a line 27 to activate an amplifier or booster 28 which receives power from a pressure reservoir 29 containing, for example, compressed air. The output from booster 28 affects two devices simultaneously. First, brake pressure is transmitted through a line 30 to the rear wheels 31 and 32 of the semitrailer 21, which are thereby braked. Secondly, the booster 28 transmits pressure to a cylinder 33 which, via a crank arm 34, opens a valve 35 which is inserted in a line 36, connecting the pressure side of the piston cylinder 25 with the wheel brakes 37, 38, and 39 on tractor vehicle 20. The valve 35 actually is opened in such a manner that there will be a two-way passage through it. Because the rear wheels 31 and 32 are being braked, however, there will be a tension force exerted through the cylinder 25 which will result in oil being delivered under pressure to the brakes of the tractor vehicle. In this way the tractor vehicle is braked by the pulling force in the drawbar, and it will be possible to dimension the piston and cylinder so that application of normal braking force on brake pedal 26 will result in an appropriate pulling force between the tractor vehicle 20 and the semitrailer 21, thus ensuring the stability of the train of vehicles. This can be done by using the already existing and recognized methods of calculation for ordinary push-activated brakes in order to avoid, to the greatest possible extent, oscillations of the tractor-trailer system. However, it is already certain that the dangerous skidding which can result from most common push-activated brakes due to the inertia of the rear vehicle can never occur in this construction.

When the driver releases brake pedal 26, braking of rear wheels 31 and 32 will cease, and simultaneously valve 35 will be reset by cylinder 33, which may be double-acting or spring-loaded in the return direction. However, valve 35 is so designed that it can never prevent the reflux of oil from the brakes to cylinder 25, a check valve being built into the rotatable valve body for this purpose.

FIGS. 4 and 5 illustrate the principle of such a valve construction. FIG. 4 shows a tapered valve body 40, seen from the end, and enclosed in a valve housing 41 with ports 42 and 43 for inlet and outlet. The port 42 is intended to be connected with cylinder 25, whereas port 43 should be connected with the tractor vehicle wheels 37, 38, and 39. The valve body 41 is designed with two diametral ducts, at right angles and displaced axially from each other. The first duct is shown in FIGS. 4 and 5 by the dotted lines 44 and 45, whereas the other duct is shown by the dotted lines 46 and 47 in FIG. 4, and by 48 in FIG. 5, where it runs at a right angle to the paper. In the first duct a check valve flap 49 is inserted. The valve body can be rotated via an arm 50, corresponding to arm 34 in FIG. 3. FIGS. 4 and 5 show only one of the many possible embodiments of such a valve. For example, the functions of the single valve shown in FIGS. 4 and 5 could be performed by any suitable conventional valve, such as a quarter-turn plug, ball, or butterfly valve, a slide valve, or a solenoid valve, in combination with a separate check valve installed in parallel therewith.

Figure 6:
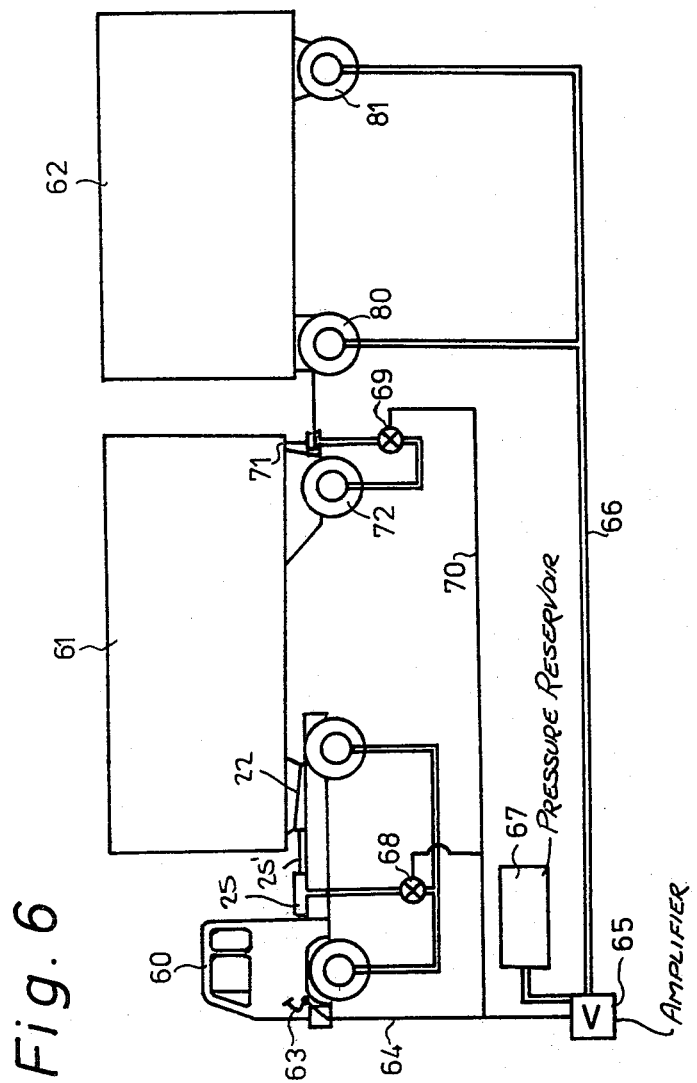
FIG. 6 shows a side view of a tractor-semitrailer combination with a second trailer, provided with another embodiment of the braking apparatus of the invention, as shown schematically below the tractor and trailers.

FIG. 6 shows a train of vehicles consisting of a tractor vehicle 60, a semitrailer 61, and a second trailer 62. The brake pedal 63 of the tractor vehicle activates a brake amplifier or booster 65 through a line 64 which then activates the brakes of the trailer 62 through pressure line 66, receiving pressure from a reservoir 67. The brake pedal 63 is also connected, by means of a line 70, to valves 68 and 69, which function in much the same way as the valve 35 in FIG. 3. The valve 68 is placed exactly as the valve 35 in FIG. 3, whereas the valve 69 is inserted between a force sensor, such as hydraulic cylinder and piston 71 placed between semitrailer 61 and trailer 62, and the rear wheels 72 of the semitrailer. It is thus evident that the braking will take place as a sort of chain reaction, starting from the back at rear wheels 80 and 81.

As a matter of fact, the invention is not limited to differential braking of several vehicles connected in line with each other. It is also possible to carry out a differentiated braking of front and rear wheels on the same vehicle. Thus, it is quite possible to imagine a slightly differential braking between wheels 80 and 81 of trailer 62. In that case it would be necessary to install a tension force sensor in the supporting construction of trailer 62 and calibrate it in an appropriate manner.

This invention is not limited to the embodiments described. Clearly it will be possible to use many different devices for measuring the pulling force and for amplifying the braking signal, just as different brake systems can be used, i.e., hydraulic, phenumatic, or combinations of these two systems. In addition, it is clear that any of the disclosed embodiments, or other embodiments coming within the scope of the invention, can incorporate individual wheel anti-skid devices of the prior art on either the rearmost wheels only (as illustrated in FIG. 2) or on any number of additional sets of wheels in a train of vehicles, as may be desired.

I claim:

1. Apparatus for braking a train of vehicles including a tractor vehicle and at least one trailer vehicle, the apparatus comprising:

braking means for at least the rear wheels of the rearmost trailer vehicle in the train of vehicles;

control means located in the tractor vehicle and operable by an operator in said tractor vehicle for actuating only said braking means for the rearmost trailer vehicle;

separate braking means for each vehicle in the train other than the rearmost trailer vehicle;

means for actuating the braking means for each other vehicle in response only to a positive tension force between said other vehicle and the next following trailer vehicle in the train; and separate switch means for said each other vehicle, each of said switch means being actuated by the control means for enabling operation of the corresponding means for actuating the braking means for said each other vehicle only when said control means is operated to actuate the braking means of the rearmost trailer vehicle.

2. Apparatus according to claim 1 wherein the means for actuating the braking means of each vehicle other than the rear trailer vehicle comprises an electrical strain gauge for measuring the tension force between each other vehicle and the immediately following trailer vehicle and an electromechanical servo-circuit for activating the braking means of each other vehicle in proportion to the output signal of the corresponding strain gauge.

3. Apparatus according to claim 1 or 2 further comprising an individual anti-skid control device installed in each set of rear wheels of the rearmost trailer vehicle.

4. Apparatus for braking a train of vehicles including a tractor vehicle and at least one trailer vehicle, the apparatus comprising:

braking means for at least the rear wheels of the rearmost trailer vehicle in the train of vehicles;

control means located in the tractor vehicle for actuating said braking means for the rearmost trailer vehicle;

separate braking means for each vehicle in the train other than the rearmost trailer vehicle;

means for actuating the braking means for each other vehicle in response to a positive tension force between said other vehicle and the next following trailer vehicle in the train; and separate switch means for each other vehicle, each switch means being actuated by the control means for enabling the corresponding means for actuating the braking means for said other vehicle only when said control means is operated to actuate the braking means of the rearmost trailer vehicle, wherein the means for actuating the braking means of each vehicle other than the rear trailer vehicle comprises an hydraulic cylinder and piston connected to one and the other, respectively, of each vehicle and the immediately following trailer vehicle such that the pressure side of the piston provides hydraulic pressure output proportional to positive tension forces between each other vehicle and the immediately following trailer vehicle and hydraulic lines for connecting the hydraulic pressure output of the cylinder and piston directly to the braking means of the corresponding other vehicle, and the switch means comprises valve means inserted in said hydraulic lines, the valve means being actuated by the control means to provide free passage both ways in said lines only when the control means actuates the braking means of the rear trailer vehicle and to permit only return flow to the corresponding piston and cylinder when the control means is not operated.

5. Apparatus according to claim 4 wherein each valve means comprises a valve housing having a first port connected to the corresponding hydraulic cylinder and piston and a second port connected to the corresponding braking means, a valve body movable in the housing between a first position and a second position, the valve body in the first position providing a clear passage in both directions between the first port and the second port and the valve body in the second position providing a passage between the first port and the second port having a one-way valve inserted therein to permit only return flow from the braking means to the hydraulic cylinder and piston, and means coupling each valve means to the control means for moving the corresponding valve body from the second position to the first position when the control means is operated to actuate the pressure braking means of the rearmost trailer vehicle.

6. Apparatus for braking a train of vehicles including a tractor vehicle and at least one trailer vehicle, the apparatus comprising:

braking means for at least the rear wheels of the rearmost trailer vehicle in the train of vehicles;

control means located in the tractor vehicle for actuating said braking means for the rearmost trailer vehicle;

separate braking means for each vehicle in the train other than the rearmost trailer vehicle;

means for actuating the braking means for each other vehicle in response to a positive tension force between said other vehicle and the next following trailer vehicle in the train; and separate switch means for each other vehicle, each switch means being actuated by the control means for enabling the corresponding means for actuating the braking means for said other vehicle only when said control means is operated to actuate the braking means of the rearmost trailer vehicle, wherein the braking means of the rearmost trailer vehicle comprises a pneumatic braking system, and the apparatus further comprises a pneumatic braking system for the tractor vehicle and switch means for placing the pneumatic braking system of the tractor vehicle on reserve when a trailer is connected to the tractor vehicle and for enabling the control means to actuate the pneumatic braking system of the tractor vehicle directly when no trailer is connected to the tractor vehicle.

7. Apparatus according to claim 6 further comprising an individual anti-skid control device installed in each set of rear wheels of the rearmost trailer vehicle.

* * * * *